US010030579B2

(12) United States Patent
Austin et al.

(10) Patent No.: US 10,030,579 B2
(45) Date of Patent: Jul. 24, 2018

(54) SYSTEMS AND METHODS FOR A MOBILE POWER PLANT WITH IMPROVED MOBILITY AND REDUCED TRAILER COUNT

(71) Applicant: General Electric Company, Schenectady, NY (US)

(72) Inventors: Kenneth Robert Austin, Houston, TX (US); Vineet Sethi, Houston, TX (US); Raymond Kalok Fong, Houston, TX (US); Jose Emmanuel Guillen, Houston, TX (US); Robert Allen Baten, Baytown, TX (US); Donald Gordon Laing, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/272,100

(22) Filed: Sep. 21, 2016

(65) Prior Publication Data
US 2018/0080377 A1 Mar. 22, 2018

(51) Int. Cl.
| F02B 63/04 | (2006.01) |
| F03G 7/08 | (2006.01) |
| H02K 7/18 | (2006.01) |
| F02C 6/00 | (2006.01) |
| F02C 3/04 | (2006.01) |

(Continued)

(52) U.S. Cl.
CPC ............... *F02C 6/00* (2013.01); *B60D 1/00* (2013.01); *B62D 53/00* (2013.01); *F02B 63/044* (2013.01); *F02C 3/04* (2013.01); *F16M 3/00* (2013.01); *F16M 5/00* (2013.01); *H02K 7/1823* (2013.01); *F05D 2220/76* (2013.01)

(58) Field of Classification Search
USPC ........ 290/1 A, 1 R; 60/797; 166/66.4, 305.1, 166/308.1
See application file for complete search history.

(56) References Cited

U.S. PATENT DOCUMENTS

| 3,453,443 A | * | 7/1969 | Stoeckly | ............... F02C 6/02 |
| | | | | 290/2 |
| 3,536,928 A | * | 10/1970 | Jones, Jr. | ............ F02B 63/04 |
| | | | | 290/1 B |

(Continued)

FOREIGN PATENT DOCUMENTS

| CN | 20112169379 U | 5/2011 |
| CN | 102619620 A | 8/2012 |

(Continued)

OTHER PUBLICATIONS

Extended European Search Report and Opinion issued in connection with corresponding EP Application No. 17191250.4 dated Jan. 22, 2018.

*Primary Examiner* — Pedro J Cuevas
(74) *Attorney, Agent, or Firm* — Fletcher Yoder, P.C.

(57) ABSTRACT

A system a first mobile body configured to support a turbine engine and an auxiliary skid communicatively and fluidly coupled to the turbine engine. The auxiliary skid includes one or more interconnects configured to support a turbine engine component. The system also includes a second mobile body configured to support a generator. The first and second mobile bodies are configured to align a removable coupling between the turbine engine and the generator.

20 Claims, 7 Drawing Sheets

(51) Int. Cl.
*B60D 1/00* (2006.01)
*B62D 53/00* (2006.01)
*F16M 5/00* (2006.01)
*F16M 3/00* (2006.01)
*F02C 7/20* (2006.01)
*E21B 4/04* (2006.01)

(56) References Cited

U.S. PATENT DOCUMENTS

| | | | |
|---|---|---|---|
| 3,791,682 A | 2/1974 | Mitchell | |
| 3,800,966 A | 4/1974 | Newton | |
| 4,098,077 A * | 7/1978 | Edmaier | B65D 85/68 |
| | | | 123/41.7 |
| 4,136,432 A * | 1/1979 | Melley, Jr. | B60P 3/00 |
| | | | 29/469 |
| 4,159,180 A * | 6/1979 | Cooper | B01F 13/0035 |
| | | | 366/26 |
| 4,159,623 A | 7/1979 | McReynolds | |
| 4,254,625 A | 3/1981 | Bergstedt et al. | |
| 4,311,395 A * | 1/1982 | Douthitt | B01F 13/0035 |
| | | | 366/27 |
| 4,667,769 A | 5/1987 | Appel | |
| 4,992,669 A * | 2/1991 | Parmley | F01B 1/12 |
| | | | 123/2 |
| 5,517,822 A | 5/1996 | Haws et al. | |
| 6,388,869 B1 | 5/2002 | Fauteux | |
| 6,450,133 B1 | 9/2002 | Bernard et al. | |
| 6,765,304 B2 | 7/2004 | Batey et al. | |
| 6,786,051 B2 | 9/2004 | Kristich et al. | |
| 6,893,487 B2 * | 5/2005 | Alger | B01D 46/10 |
| | | | 55/385.1 |
| 6,895,903 B2 | 5/2005 | Campion | |
| 7,007,966 B2 | 3/2006 | Campion | |
| 7,081,682 B2 * | 7/2006 | Campion | F02B 63/04 |
| | | | 123/2 |
| 7,122,913 B2 * | 10/2006 | Witten | F02B 63/04 |
| | | | 123/3 |
| 7,221,061 B2 * | 5/2007 | Alger | F02B 63/04 |
| | | | 290/1 A |
| 7,466,033 B2 * | 12/2008 | Witten | F02B 63/04 |
| | | | 290/1 A |
| 7,608,934 B1 * | 10/2009 | Hunter | F02D 25/00 |
| | | | 290/4 R |
| 7,615,876 B2 * | 11/2009 | Marshall | F02B 63/04 |
| | | | 290/1 A |
| 7,619,319 B1 * | 11/2009 | Hunter | B60L 11/1816 |
| | | | 290/4 R |
| 7,819,209 B1 * | 10/2010 | Bezner | B62D 57/02 |
| | | | 180/8.1 |
| 7,921,914 B2 * | 4/2011 | Bruins | E21B 43/26 |
| | | | 166/177.5 |
| 8,294,285 B2 * | 10/2012 | Hunter | B60L 8/003 |
| | | | 290/1 R |
| 8,294,286 B2 * | 10/2012 | Hunter | F02D 29/06 |
| | | | 290/1 A |
| 8,495,869 B2 * | 7/2013 | Beissler | F01N 13/00 |
| | | | 60/274 |
| 8,587,136 B2 * | 11/2013 | Williams | F01K 13/00 |
| | | | 290/1 A |
| 8,789,601 B2 * | 7/2014 | Broussard | E21B 43/26 |
| | | | 166/177.5 |
| 9,103,193 B2 * | 8/2015 | Coli | E21B 43/26 |
| 9,140,110 B2 * | 9/2015 | Coli | E21B 43/26 |
| 9,534,473 B2 * | 1/2017 | Morris | F01D 15/00 |
| 9,562,420 B2 * | 2/2017 | Morris | F01D 15/00 |
| 2003/0030246 A1 | 2/2003 | Campion | |
| 2003/0033994 A1 | 2/2003 | Campion | |
| 2003/0057704 A1 | 3/2003 | Baten et al. | |
| 2003/0079479 A1 | 5/2003 | Kristich et al. | |
| 2004/0104577 A1 * | 6/2004 | Alger | F02B 63/04 |
| | | | 290/1 A |
| 2006/0080971 A1 | 4/2006 | Smith et al. | |
| 2006/0260331 A1 * | 11/2006 | Andreychuk | F04B 15/08 |
| | | | 62/50.2 |
| 2009/0068031 A1 * | 3/2009 | Gambier | F04B 17/05 |
| | | | 417/364 |
| 2009/0308602 A1 * | 12/2009 | Bruins | E21B 21/062 |
| | | | 166/250.01 |
| 2012/0255734 A1 * | 10/2012 | Coli | E21B 43/26 |
| | | | 166/305.1 |
| 2014/0096974 A1 * | 4/2014 | Coli | E21B 43/26 |
| | | | 166/358 |
| 2014/0138079 A1 * | 5/2014 | Broussard | E21B 43/26 |
| | | | 166/66.4 |
| 2014/0174717 A1 * | 6/2014 | Broussard | E21B 43/26 |
| | | | 166/66.4 |
| 2015/0027712 A1 * | 1/2015 | Vicknair | E21B 43/162 |
| | | | 166/305.1 |
| 2015/0068754 A1 * | 3/2015 | Coli | E21B 43/26 |
| | | | 166/308.1 |
| 2015/0252661 A1 * | 9/2015 | Glass | E21B 43/267 |
| | | | 166/308.1 |
| 2015/0300145 A1 * | 10/2015 | Coli | E21B 43/26 |
| | | | 166/308.1 |
| 2015/0314255 A1 * | 11/2015 | Coli | E21B 43/26 |
| | | | 366/150.1 |
| 2016/0075387 A1 * | 3/2016 | Fong | B62D 63/08 |
| | | | 403/14 |
| 2016/0177675 A1 * | 6/2016 | Morris | F01D 15/00 |
| | | | 166/308.1 |
| 2016/0177678 A1 * | 6/2016 | Morris | F01D 15/00 |
| | | | 60/772 |
| 2016/0369609 A1 * | 12/2016 | Morris | E21B 43/26 |
| 2017/0104389 A1 * | 4/2017 | Morris | F01D 15/00 |

FOREIGN PATENT DOCUMENTS

| | | |
|---|---|---|
| EP | 2 910 711 A1 | 8/2015 |
| RU | 2342542 C1 | 12/2008 |
| WO | 9429576 A2 | 12/1994 |

* cited by examiner

SYSTEMS AND METHODS FOR A MOBILE POWER PLANT WITH IMPROVED MOBILITY AND REDUCED TRAILER COUNT

BACKGROUND OF THE INVENTION

The subject matter disclosed herein relates to gas turbine systems, and more particularly to systems and methods for transporting and installing mobile turbomachinery.

Typically, permanent power plants are built to provide power to customers connected to a power grid. However, there are a variety of reasons that the permanent power plant may not be able to meet the power demand of the customers. For example, in periods of intense growth, the demand by customers may increase to surpass the amount of power the permanent power plant can generate. In some cases, the permanent plant may be shut down or undergo equipment maintenance. As further example, natural disasters such as hurricanes and earthquakes can disrupt power for a portion of the customers.

Mobile power plants may be transported to an environment to meet power demands of customers where permanent power plants may not be able to deliver power, or may not be able to deliver power efficiently. In some situations, mobile power plants may be delivered to a site in a partially assembled state of components, followed by on-site setup of those components. Depending on various external conditions, the transport and the on-site installation of the mobile power plants may take as long as a few hours to a few days. Accordingly, it may be beneficial to provide systems and methods that improve the mobility of the components of the mobile power plants, in order to efficiently transport these components to the site. Further, it may be beneficial to provide systems and methods that improve the installation time of these components on-site, in order to quickly meet customer demands for power.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system a first mobile body configured to support a turbine engine and an auxiliary skid communicatively and fluidly coupled to the turbine engine. The auxiliary skid includes one or more interconnects configured to support a turbine engine component. The system also includes a second mobile body configured to support a generator. The first and second mobile bodies are configured to align a removable coupling between the turbine engine and the generator.

In a second embodiment, a system includes a first mobile body configured to support a turbine engine and an auxiliary skid communicatively and fluidly coupled to the turbine engine. The auxiliary skid includes a controller configured to support a turbine engine component. The system includes a second mobile body configured to support a generator. The first and second mobile bodies are configured to align a removable coupling between the turbine engine and the generator. The system also includes a third mobile body configured to support a control system communicatively coupled to the controller of the auxiliary skid.

In a third embodiment, a system includes first mobile body configured to support a turbine engine and an auxiliary skid communicatively and fluidly coupled to the turbine engine. The auxiliary skid includes a controller communicatively coupled to a turbine engine support component. The system includes a second mobile body configured to support a control system communicatively coupled to the controller of the auxiliary skid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems and methods for transporting components of a mobile power plant system to an installation site to meet power demands of customers where permanent power plants may not be able to deliver power. The mobile power plant may be a trailer mounted system that is transported by ship, air, or road to the installation site. In some situations, the mobile power plant may be delivered to the installation site in a partially assembled state of components, with components mounted or disposed on one or more trailers (or other types of mobile bodies). The disclosed embodiments are directed to a mobile power plant system that includes a generator trailer, a turbine trailer, and a control house trailer. In certain embodiments, the mobile power plant system may include a transport trailer for transporting one or more components to the installation site. In these embodiments, the one or more components disposed on the transport trailer may be transferred from the transport trailer to the generator trailer and/or the turbine trailer on the installation site.

It may be beneficial to transport the partially assembled components of the mobile power plant system to the installation site in an efficient manner, in order to quickly meet the power demands of customers. Accordingly, the disclosed embodiments are directed to systems and methods for reducing a trailer count of the mobile power plant system by improving the arrangement of the partially assembled components disposed on the one or more trailers during transportation. Indeed, utilizing fewer trailers to transport the partially assembled components may help to improve ease of transportation and may help reduce the time and cost associated with transporting the mobile power plant system to the installation site. Further, improving the arrangement of the components on the trailers and/or reorganizing the partially assembled components on the one or more trailers may help to reduce the number of trailers utilized for transporting the mobile power plant system to the installation site.

Furthermore, the disclosed embodiments may enable quick setup on-site for the mobile power plant system. In certain embodiments, the disclosed embodiments are configured for reducing a number of electrical power and data communication cables (e.g., cables) utilized to connect the turbine trailer and the control house trailer. In particular, the arrangement of the partially assembled components on the one or more trailers may help reduce interconnects between the one or more trailers, thereby reducing an installation time and improving a speed with which the mobile power plant system may be assembled. Additionally, reducing the number of electrical power and data communication cables may help repeated installations (e.g., install and uninstall) of the mobile power plant system. For example, the disclosed embodiments may enable quick disconnect and relocation to another installation site, thereby improving the flexibility and mobility of the mobile power plant system. Indeed, the ability to quickly transport the components and commission the mobile power plant system may reduce downtime of the system components and lost revenue. With the forgoing in mind, features of the disclosed embodiments may improve the mobility of various component of the mobile power plant as they are transported to the installation site, and may provide for a quicker installation time of the mobile power plant on the installation site.

For example, in certain embodiments, during a transportation phase of the mobile power plant system, various components of the mobile power plant system may be disposed on one or more trailers (e.g., generator trailer, turbine trailer, control house trailer, transport trailer, etc.) and transported to the installation site. For example, a generator trailer may include a generator that generates power for the mobile power plant system. Further, a turbine trailer may include a gas turbine engine, an intake section that includes a silencer disposed within a housing, and/or an auxiliary skid. In certain embodiments, the auxiliary skid may be disposed at the rear of the turbine trailer and may include a number of components that are coupled (e.g., communicatively coupled) to a number of the components disposed on the turbine trailer (e.g., gas turbine engine). In certain embodiments, the auxiliary skid may be disposed at the front of the turbine trailer. In certain embodiments, the control house trailer may transport a control system having a controller, a ventilation system for the gas turbine engine, and an air ventilation system for the generator. Further, in certain embodiments, the transport trailer may include a filter assembly, an air inlet filter assembly, and/or an exhaust stack. In certain embodiments, the transport trailer may include a crane that may be utilized to transfer each of these components from the transport trailer to the generator trailer and/or the turbine trailer during an installation phase of the mobile power plant system.

In certain embodiments, the auxiliary skid disposed on the turbine trailer may include a turbine trailer control panel, a water wash system, an engine lubrication system, and/or a start system (e.g., hydraulics start system). In certain embodiments, the auxiliary skid may include one or more interconnects (e.g., electrical power and data communication cables) between components of the auxiliary skid and the gas turbine engine. For example, the hydraulics start system disposed within the auxiliary skid may be configured to control and/or regulate a hydraulics motor of the gas turbine engine. As a further example, the engine lubrication system and/or the water wash system may be disposed within the auxiliary skid on the turbine trailer and may be configured to control and/or regulate a lubricant and a water flow for the gas turbine engine, respectively. Furthermore, in certain embodiments, components disposed within the turbine trailer control panel of the auxiliary skid may include one or more features for monitoring and/or controlling an operation of the gas turbine engine. In particular, these components disposed within the auxiliary skid may help reduce the number of interconnects typically found between the one or more trailers, thereby reducing an installation time and improving a speed with which the mobile power plant system may be assembled.

Figure 1:
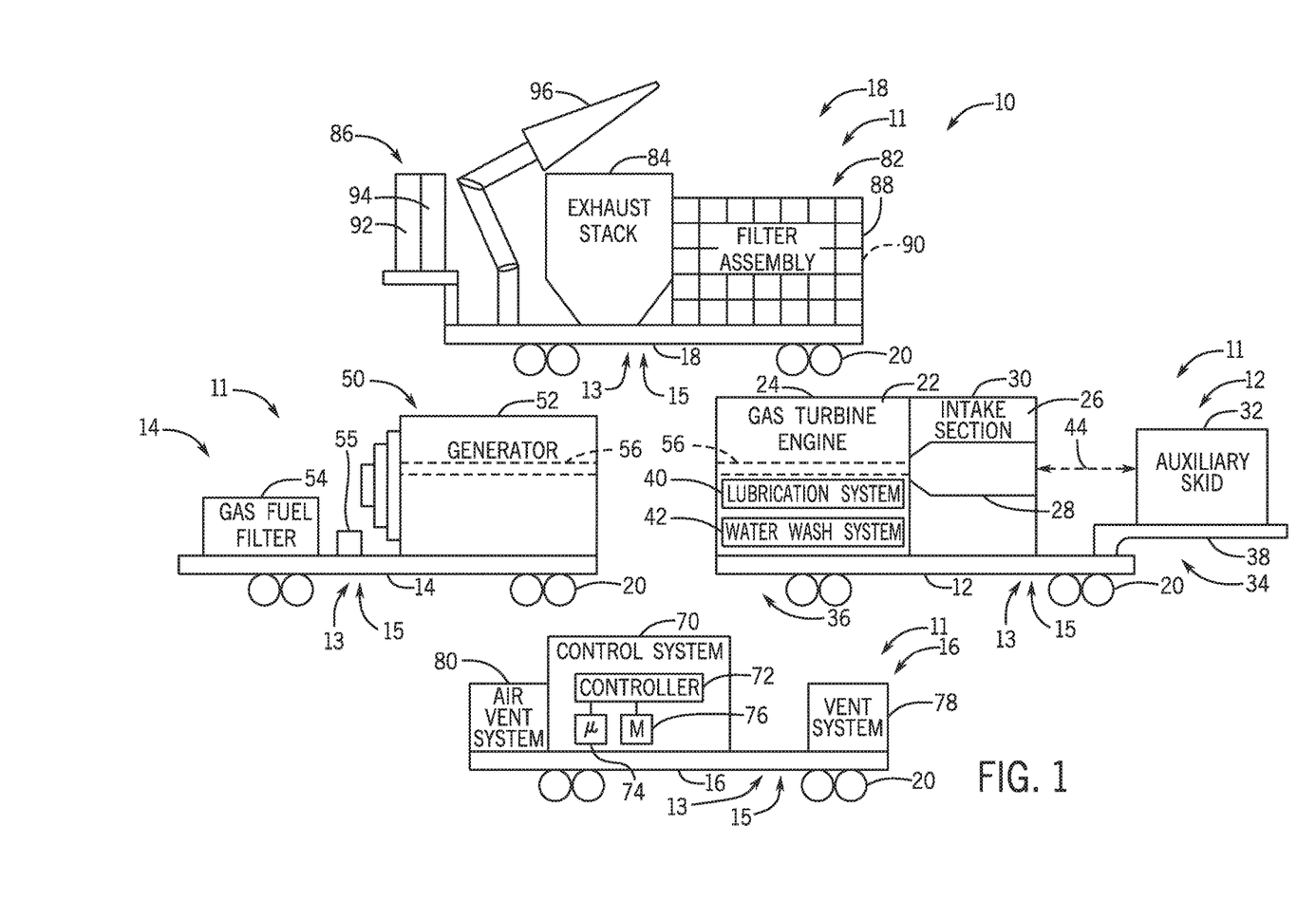
FIG. 1 is a block diagram of an embodiment of a mobile power plant system during a transportation phase, where the mobile power plant includes a generator trailer, a turbine trailer having an auxiliary skid, a transport trailer, and a control house trailer.

Turning now to the drawings, FIG. 1 is a block diagram of an embodiment of a mobile power plant system 10 during a transportation phase. Specifically, the mobile power plant system 10 includes one or more trailers 11 that are configured to transport turbomachinery (e.g., one or more components of the mobile power plant system 10) to a desired location, such as to an installation site (e.g., on-site location) to meet power demands of customers including where permanent power plants may or may not be able to deliver power. In certain embodiments, the mobile power plant system 10 includes a turbine trailer 12, a generator trailer 14, and a control house trailer 16 to transport one or more components of the mobile power plant system 10 to the installation site. In certain embodiments, the mobile power plant system 10 may additionally include a transport trailer 18 to transport one or more additional components to the desired location. In certain embodiments, the components disposed on the transport trailer 18 and/or the control house trailer 16 may alternatively be transported via traditional transport techniques. In particular, the configuration of the mobile power plant system 10 during a transportation phase may allow for quicker installation time, lower installation cost, and greater mobility, as further described in detail below.

Figure 4:
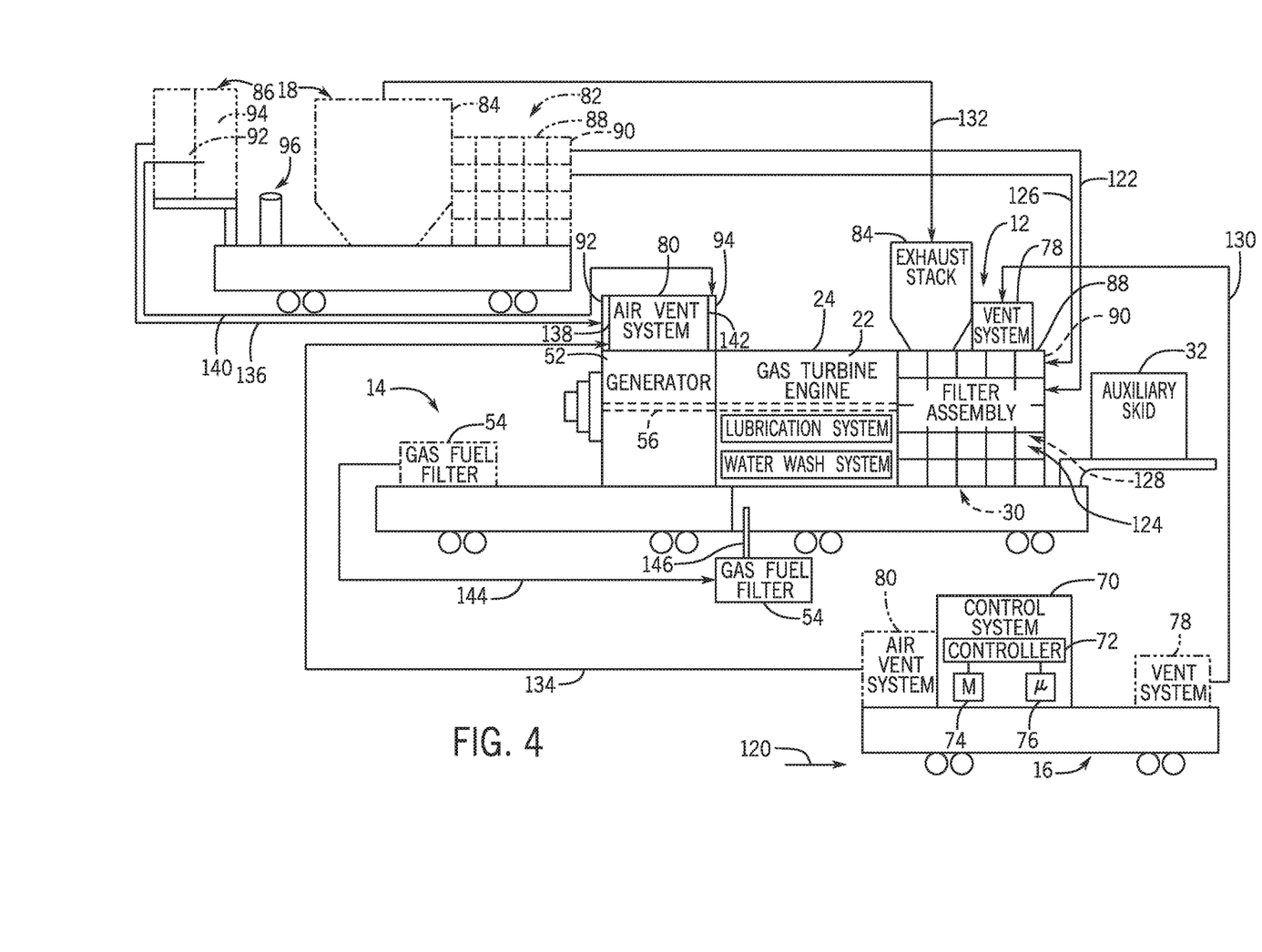
FIG. 4 is a block diagram of an embodiment of the mobile power plant system of FIG. 1 during an installation phase.

In certain embodiments, as further described in detail with respect to FIG. 4, the components of the mobile power plant system 10 may be assembled together during an installation phase to generate power. For example, after the components are transported to the installation site via the trailers 11, one or more of the components may be transferred between the trailers 11 during the installation phase. Furthermore, one or more of the components may be assembled together during the installation phase to generate power. For example, in certain embodiments, as further described with respect to FIG. 4, one or more components on the transport trailer 18 may be transferred to the generator trailer 14 and/or the turbine trailer 12 during the installation phase. Similarly, in certain embodiments, as further described with respect to FIG. 4, one or more components on the control house trailer 16 may be transferred to the generator trailer 14 and/or the turbine trailer 12 during the installation phase. In particular, while the illustrated embodiment details a particular transportation phase configuration, it should be noted that other transportation phase configurations may be utilized, as further described below.

In certain embodiments, the mobile power plant system 10 may enable power needs of industrial businesses to be met on site without constructing a traditional power plant. For example, the mobile power plant system 10 may be utilized in settings such as an industrial operation or emergency site (e.g., a blackout, brownout, a natural disaster such as a flood, hurricane, or earthquakes, etc.). Accordingly, the mobile power plant system 10 may include a plurality of wheels 20 disposed beneath each of the trailers 11 (e.g., the turbine trailer 12, the generator trailer 14, the control house trailer 16, and/or the transport trailer 18) to enable efficient transportation and installation. In certain embodiments, the trailers 11 may include a modular design that enables faster installation on site. Specifically, various components of the mobile power plant system 10 may be mounted on one or more trailers 11 and transported (e.g., via sea, land, air) such that the mobile turbine system 10 can be deployed and commissioned quickly once it arrives to its designated location to provide power. In particular, in certain embodiments, the arrangement of the components of the mobile power plant system 10 between each of the one or more trailers 11 may help reduce the time and cost associated with transporting the mobile power plant system to the installation site.

In certain embodiments, the trailers 11 may include various features that enable efficient transportation to the designated site. For example, each one of the trailers 11 may include one or more steerable axles 13 that help improve mobility on land by minimizing a turning circle. Further, it should be noted that the axles span of each one of the trailers 11 may be easily adjusted to meet the regulatory standards of a particular country. In certain embodiments, each one of the trailers 11 may include an air ride suspension system 15 that may be configured to assist in adjusting a quick alignment (and/or docking procedure) between one or more of the trailers 11. In particular, each one of the trailers 11 may include various features that enable weight (e.g., weight from components supported by the trailers 11) distribution on the trailers 11. For example, the weight distribution may be determined based on country regulations, on a number and/or type of axle, on the structure of the trailer 11, on the number and/or type of components to be transported, or a combination thereof. For example, in certain embodiments, the components of the mobile power plant system 10 may be arranged on the trailers 11 based on the number and weight of components to be transported and the available axles (e.g., each axle may support a different amount of weight) and/or structure (e.g., a gooseneck on the trailer 11 may support additional weight).

In certain embodiments, during the transportation phase, the turbine trailer 12 may be configured to transport a turbine (e.g., a gas turbine engine 22, a steam turbine, a hydroturbine, a wind turbine, or any turbine system) to an installation site. For example, the gas turbine engine 22 disposed within an enclosure 24 may be mounted on the turbine trailer 12. Further, during a transportation phase, an air intake section 26 having a silencer 28 disposed within a housing 30 may be mounted on the turbine trailer 12. In certain embodiments, an auxiliary skid 32 may be disposed at a rear end 34 (e.g., opposite a head end 36) of the turbine trailer 12. For example, in the illustrated embodiment, the auxiliary skid 32 may be mounted on a rear attachment 38 of the turbine trailer 12. In certain embodiments, the auxiliary skid 32 may be disposed at the front end of the turbine trailer 12, and may be mounted on a front attachment 38. In certain embodiments, additional support systems may be disposed within the enclosure 24, and/or may be coupled or integrated within the gas turbine engine 22. For example, a lubrication system 40 configured to circulate a lubricant through moving parts of the gas turbine engine 22, and/or a water wash system 42 configured to inject one or more fluid flows (e.g., water, steam, etc.) may be disposed on the turbine trailer 12.

Figure 5:
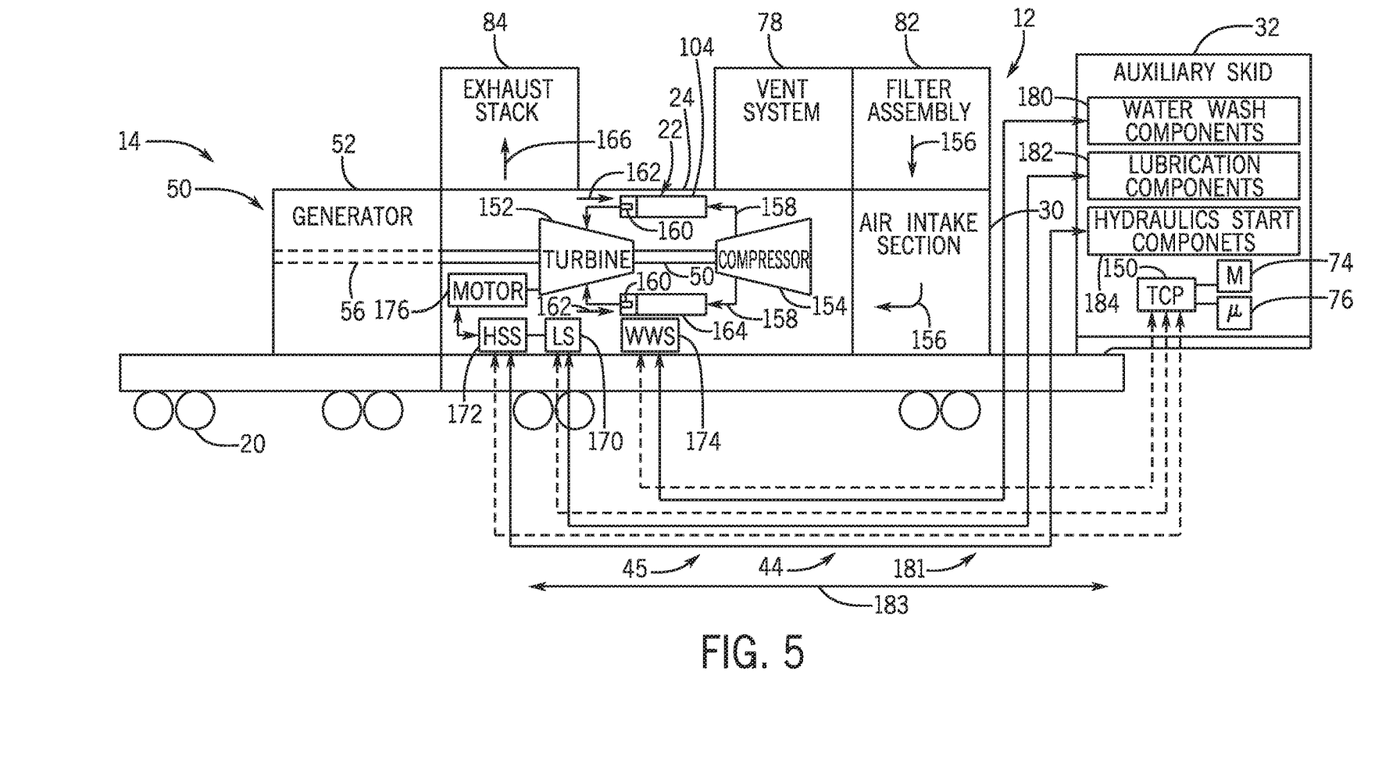
FIG. 5 is a block diagram of an embodiment of the mobile power plant system of FIG. 1, depicting one or more interconnects between the auxiliary skid and the gas turbine engine.

As further described in detail with respect to FIG. 5, the auxiliary skid 32 may include one or more quick interconnects 44 (e.g., electrical power and/or data communication cables) between components of the auxiliary skid 32 and the gas turbine engine 22, the lubrication system 40, and/or the water wash system 42. In certain embodiments, the auxiliary skid 32 may include one or more components configured to regulate and/or monitor the gas turbine engine 22 and/or the support systems (e.g., the lubrication system 40, the water wash system 42, etc.). It should be noted that other support systems may be associated with the gas turbine engine 22, such as a fluid injection system configured to inject one or more fluid flows (e.g., water, steam, inert gas such as nitrogen, recirculated exhaust gas, or any combination thereof) into the gas turbine engine 22, a coolant system, a fuel system configured to supply a fuel flow, a thermal/clearance control system, or any other support system associated with the gas turbine engine 22.

In certain embodiments, during the transportation phase, a load 50 of the mobile power plant system 10 may include a generator 52. In the illustrated embodiment, the generator 52 is configured to generate power for the mobile power plant system 10 may be mounted on the generator trailer 14. Furthermore, in certain embodiments, one or more additional support components, such as a gas fuel filter 54, may be mounted on the generator trailer 14 during the transportation phase and/or the installation phase. In certain embodiments, various other components 55 (e.g., switch gear, heat exchanger, etc.) may be mounted on the generator trailer 14 during the transportation phase and/or the installation phase.

For example, in certain embodiments, a switch gear configured to connect the generator 52 to the power grid may be mounted on the generator trailer 14. As a further example, a heat exchanger configured to cool generator lube oil may be mounted on the generator trailer 14 during the transportation phase. As further described with respect to FIG. 4, the one or more support components mounted on the generator trailer 14 may be transferred during an installation phase of the mobile power plant system 10. The gas turbine engine 22 may be removably coupled to the generator 52 via a common shaft 56, and may drive the generator 52. In particular, during the installation phase, the generator 52 may be aligned with the gas turbine engine 22 via the generator trailer 14 and the turbine trailer 12, respectively. Further, the generator 52 may be removably coupled to the gas turbine engine 22 during a docking process of the installation phase.

In certain embodiments, during the transportation phase, the control house trailer 16 may include one or more components configured to monitor and/or regulate the operations of the mobile power plant system 10. For example, the control house trailer 16 may include a battery system, a fire suppression system (e.g., firewalls), a charging system, and/or other systems for controlling or regulating the operations of the mobile power plant system 10. In certain embodiments, a control system 70 including a controller 72 coupled to a processor 74 and a memory 76 may be mounted on the control house trailer 16 during the transportation phase and/or the installation phase. Further, in certain embodiments, during a transportation phase, a vent system 78 (associated with the gas turbine engine 22) and an air vent system 80 (associated with the generator 52) may be mounted on the control house trailer 16. As further described with respect to FIG. 4, during an installation phase, the vent system 78 may be transferred to the turbine trailer 12 and the air vent system 80 may be transferred to the generator trailer 14. Specifically, as further described with respect to FIGS. 4 and 5, the vent system 78 may be configured to ventilate the space surrounding the gas turbine engine 22, and the air vent system 80 may be configured to ventilate the space surrounding the generator 52. In certain embodiments, the vent system 78 may include a plurality of fans to enable sufficient cooling of the gas turbine engine 22, and more particularly, the enclosure 24 within which the gas turbine engine 22 is disposed within.

In certain embodiments, the controller 72 of the control system 70 may be configured to receive and process feedback from gas turbine engine 22 via the auxiliary skid 32. For example, the memory 76 stores software instructions or code that is executable by the processor 74 to control various aspects of the gas turbine engine 22 and the support systems (e.g., the lubrication system 40, the water wash system 42, etc.). Specifically, as noted above, the auxiliary skid 32 may include one or more interconnects configured to interface with the gas turbine engine 22 and support systems associated with the gas turbine engine 22 (e.g., the lubrication system 40, the water wash system 42, etc.). In certain embodiments, the controller 72 may be configured to interface with the auxiliary skid 32 to receive and process feedback from the gas turbine engine 22 and/or the support systems associated with the gas turbine engine 22. In this manner, the controller 72 may be configured to receive and process feedback related to the gas turbine engine 22 via the auxiliary skid 32, thereby reducing a number of electrical and/or communication lines (e.g., cables) between the control house trailer 16 and the turbine trailer 12, as further described with respect to FIG. 5.

In certain embodiments, during the transportation phase, the transport trailer 18 may be configured to transport a filter assembly 82, an exhaust stack 84, and an air inlet filter assembly 86. In certain embodiments, the filter assembly 82 may include a first filter 88 and a second filter 90. In particular, as further described with respect to FIG. 4, the filter assembly 82 may be transferred from the transport trailer 18 to the turbine trailer 12 during the installation phase, and may be configured to couple with the air intake section 26 and the vent system 78. The filter assembly 82 may be configured to filter and intake the air flow into the gas turbine engine 22, as further described with respect to FIGS. 4 and 5. Furthermore, in certain embodiments, the air inlet filter assembly 86 may include a first air inlet filter 92 and a second air inlet filter 94. As further described with respect to FIG. 4, the air inlet filter assembly 86 may be transferred from the transport trailer 18 to the generator trailer 14 during the installation phase, and may be configured to couple with the air vent system 80. The air inlet filter assembly 86 may be configured to filter the air flow into the generator 52, as further described with respect to FIGS. 4 and 5. In certain embodiments, the transport trailer 18 may be configured to transport the exhaust stack 84 (e.g., conduit, silencer, emissions control equipment), which may be configured to discharge an exhaust gas from the gas turbine engine 22, as further described with respect to FIG. 5.

In particular, in certain embodiments, the transport trailer 18 may include a crane 96, which may be utilized during the installation phase to transfer one or more components from transport trailer 18 to the turbine trailer 12 and/or the generator trailer 14. For example, as further described with respect to FIG. 4, the crane 96 may be utilized to transfer the filter assembly 82 and the exhaust stack 84 to the turbine trailer 12. Furthermore, as described with respect to FIG. 4, the crane 96 may be utilized to transfer the air inlet filter assembly 86 to the generator trailer 14. It should be noted that in certain embodiments, one or more additional components of the mobile power plant system 10 may be transported to the installation site on the transport trailer 18. For example, the gas fuel filter 54, the air vent system 80, and/or the vent system 78 may be mounted on the transport trailer 18 for transport to the installation site. Likewise, in certain embodiments, one or more components mounted on the transport trailer 18 may be mounted on the control house trailer 16 for transport, and/or may be transported via alternative transportation techniques.

Figure 2:
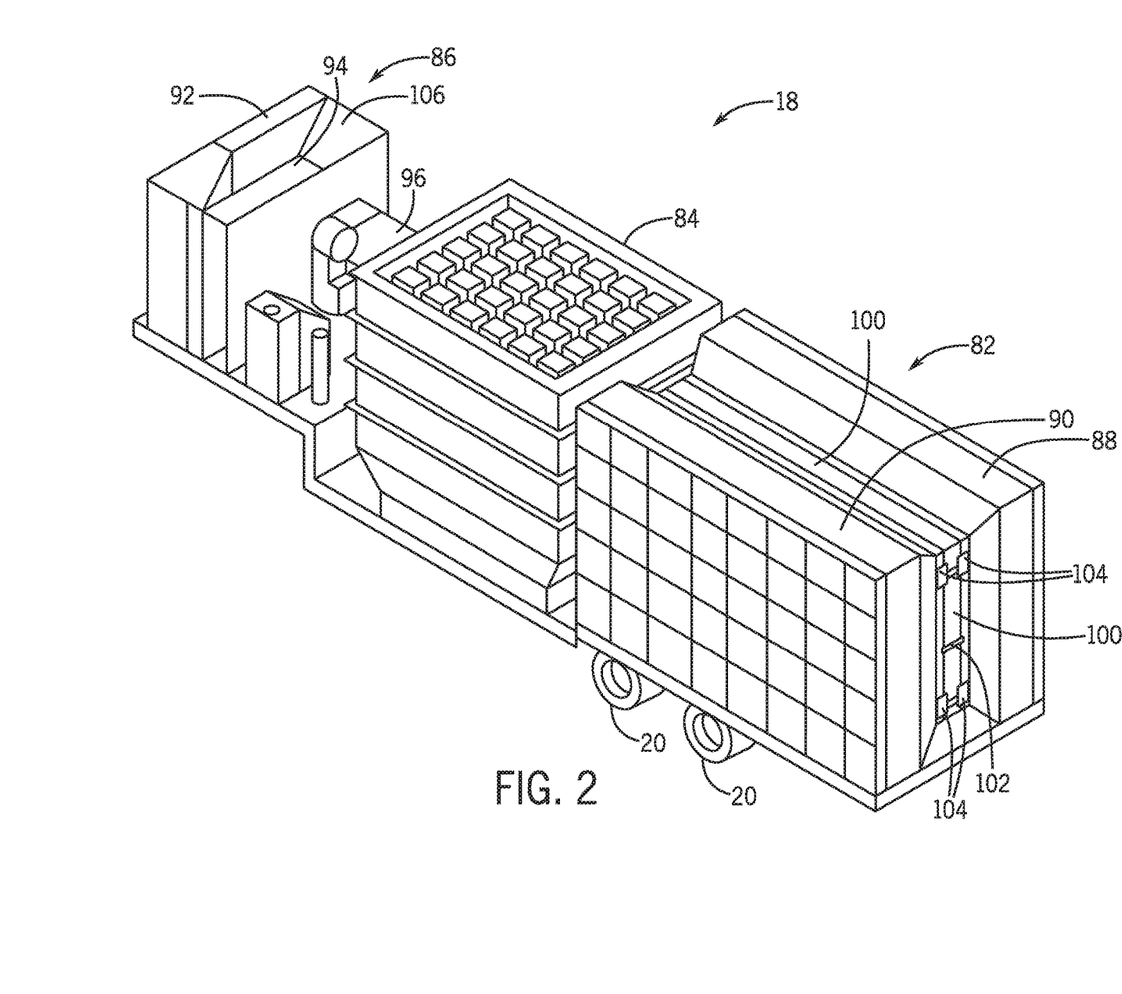
FIG. 2 is a perspective view of an embodiment of the transport trailer of FIG. 1, during a transportation phase of the mobile power plant system.

FIG. 2 is a perspective view of an embodiment of the transport trailer 18 of FIG. 1, during the transportation phase of the mobile power plant system 10. In the illustrated embodiment, the transport trailer 18 includes the filter assembly 82 (e.g., the first filter 88 and the second filter 90), the exhaust stack 84, and the air inlet filter assembly 86 (e.g., the first air inlet filter 92 and the second air inlet filter 94). In certain embodiments, the transport trailer 18 may include the crane 96 configured to transfer one or more components mounted on the transport trailer 18 onto the turbine trailer 12 and/or the generator trailer 14. In certain embodiments, any alternative transfer mechanism may be utilized to transfer the one or more components from the transport trailer 18 to the turbine trailer 12 and/or the generator trailer 14.

In certain embodiments, the crane 96 may be utilized to transfer the first filter 88 and the second filter 90 of the filter assembly 82 from the transport trailer 18 to the turbine trailer 12. Specifically, the first and second filters 88, 90 may be coupled to the air intake section 26 associated with the gas turbine engine 22 and mounted on the turbine trailer 12. During a transportation phase, the filter assembly 82 may be disposed vertically on the transport trailer 18, such that the first and second filters 88, 90 are coupled along a centerline connection 100. In certain embodiments, the centerline connection 100 may include one or more attachment mechanisms 102 (e.g., bolts, fasteners, screws, etc.) that are configured to secure the first and second filters 88, 90 to each other and to the transport trailer 18. Furthermore, in certain embodiments, the first filter 88 and the second filter 90 may each include one or more support mechanisms 104 configured to engage with the centerline connection 100 via one or more attachment mechanisms 102. In certain embodiments, the one or more support mechanisms 104 may be utilized to couple each of the filters 88, 90 to the air intake section 26 during the installation phase.

In certain embodiments, the first air inlet filter 92 and the second air inlet filter 94 of the air inlet assembly 86 may be disposed within a filter housing 106. Specifically, the filter housing 106 may be configured to enclose and/or partially enclose the air inlet assembly 86, thereby securing the individual components of the air inlet assembly 86 during the transportation phase. In certain embodiments, an operator may uncouple one or more attachment mechanisms 104 or disengage the filter housing 106 to allow the crane 96 (or other transfer device) to transfer the filter assembly 82 and/or the air inlet assembly 86 to the generator trailer 14.

Figure 3:
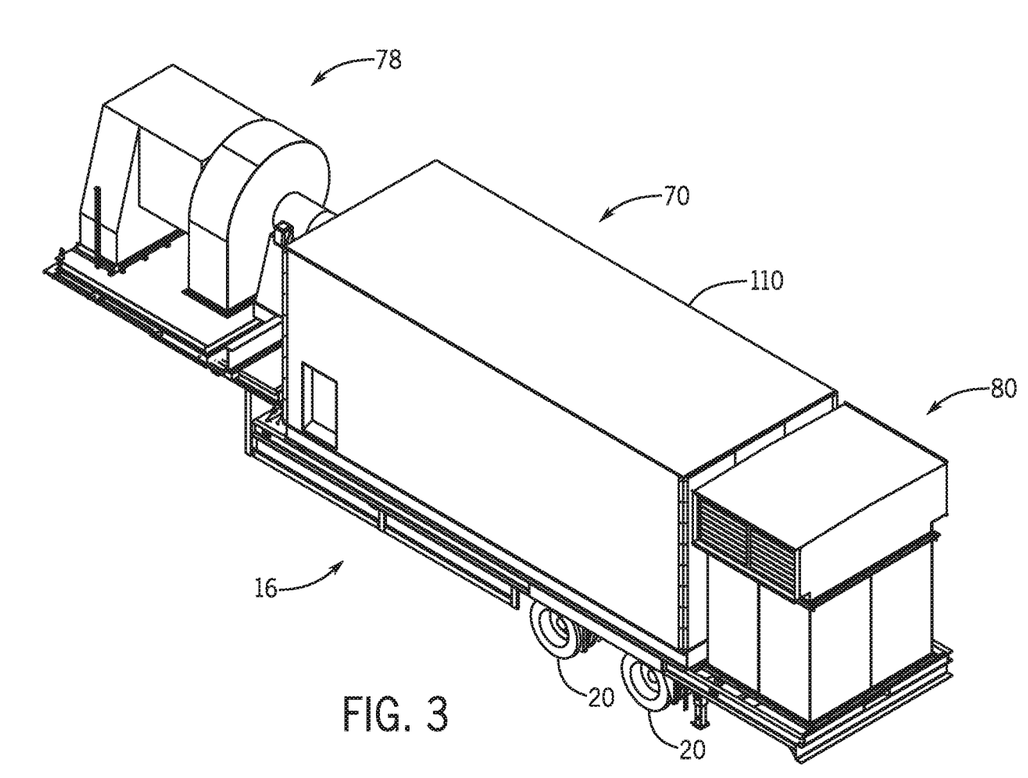
FIG. 3 is a perspective view of an embodiment of the control house trailer of FIG. 1, during a transportation phase of the mobile power plant system.

FIG. 3 is a perspective view of an embodiment of the control house trailer 16 of FIG. 1, during a transportation phase of the mobile power plant system 10. In the illustrated embodiment, the control house trailer 16 includes the control system 70, the vent system 78, and the air vent system 80. In certain embodiments, as noted above, during the installation phase, the vent system 78 may be transferred from the control house trailer 16 to the turbine trailer 12, as further described with respect to FIG. 4. Furthermore, the air vent system 80 may be transferred from the control house trailer 16 to the generator trailer 14, as further described with respect to FIG. 4.

In certain embodiments, the control system 70 may be disposed within a control housing 110, which may be configured to secure the controller 72 (coupled to the processor 74 and the memory 76) within during transport. In certain embodiments, the controller 72 may interface directly with components mounted on the turbine trailer 12 (or the generator trailer 14) with one or more direct electrical power and data communication cables (e.g., cables). Further, as noted above, in certain embodiments, the controller 72 may be configured to interface with the auxiliary skid 32 of the turbine trailer 12. Specifically, the controller 70 may be configured to receive and process feedback from the auxiliary skid 32, which in turn may be communicatively coupled to one or more components of the gas turbine engine 22. Accordingly, in certain embodiments, the auxiliary skid 32 disposed on the turbine trailer 12 may be configured to reduce a number of interconnects between the control house trailer 16 and the turbine trailer 12, as further described with respect to FIG. 5.

FIG. 4 is a block diagram of an embodiment of the mobile power plant system of FIG. 1 during an installation phase. During the installation phase, the generator 52 mounted on the generator trailer 14 may be removably coupled with the gas turbine engine 22 mounted on the turbine trailer 12. Specifically, the generator 52 may be aligned with the gas turbine engine 22 during a docking process, and the generator trailer 14 may move in a reverse direction 120 as the turbine trailer 12 is stationary so that the generator 52 may be removably coupled with the gas turbine engine 22. In certain embodiments, the turbine trailer 12 may move towards the stationary generator trailer 14 and/or both trailers 12, 14 may move towards one another during the docking process. In certain embodiments, after the generator 52 is removably coupled with the gas turbine engine 22, one or more components mounted on the transport trailer 18 and/or the control house trailer 16 may be transferred to complete the installation and commissioning of the mobile power plant system 10. In certain embodiments, the one or more components mounted on the transport trailer 18 and/or the control house trailer 16 may be transferred and installed prior to the docking process.

As noted above, during the installation phase, one or more components on the transport trailer 18 and/or the control house trailer 16 may be transferred to the generator trailer 14 and/or the turbine trailer 12. For example, in certain embodiments, the filter assembly 82 and the exhaust stack 84 may be transferred from the transport trailer 18 to the turbine trailer 12. Specifically, the first filter 88 may be transferred along a reference path 122 to be coupled to a first side 124 of the air intake section 30. Likewise, the second filter 90 may be transferred along a reference path 126 to be coupled to a second side 128 (opposite the first side 124) of the air intake section 30. In particular embodiments, as noted above with respect to FIG. 2, the first and second filters 88, 90 may be fastened or secured to the air intake section 30 via the one or more attachment mechanisms 102. Furthermore, the one or more support mechanisms 104 may be utilized to secure the first and second filters 88, 90 along the first and second sides 124, 128 of the air intake section 30. Likewise, in certain embodiments, the exhaust stack 84 may be transferred along a reference path 132 from the transport trailer 18 to the turbine trailer 12, such that it is disposed to the top surface of the enclosure 24.

Furthermore, in certain embodiments, the vent system 78 may be transferred along a reference path 130 from the control house trailer 16 to the turbine trailer 12. In the illustrated embodiment, the vent system 78 may be mounted above the air intake section 30 and the gas turbine engine 22, such that it is coupled to a top surface of the enclosure 24. Furthermore, in certain embodiments, the air vent system 80 may be transferred along a reference path 134 from the control house trailer 16 to the generator trailer 14. In the illustrated embodiment, the air vent system 80 may be mounted above the generator 52, such that it is disposed above a top surface of the generator 52. Additionally, in certain embodiments, the air inlet filter assembly 86 (including the first air inlet filter 92 and the second air inlet filter 94) may be transferred from the transport trailer 18 to the generator trailer 14. Specifically, in the illustrated embodiment, the first air inlet filter 92 may be transferred along a reference path 136 (from the transport trailer 18 to the generator trailer 14) and coupled to a first side 138 of the air vent system 78. Further, the second air inlet filter 94 may be transferred along a reference path 140 (from the transport trailer 18 to the generator trailer 14) and coupled to a second side 142 of the air vent system 78.

In certain embodiments, one or more additional components may be mounted on the turbine trailer 12 and/or the generator trailer 14, and may be transferred during the installation phase. For example, in the illustrated embodiment, the gas fuel filter 54 may be disposed on the generator trailer 14, and may be transferred along a reference path 144 and coupled to an interconnect hose 146 associated with the turbine trailer 12. In particular, the gas fuel filter 54 may be configured to filter a gas fuel, such as natural gas, propane, etc.

FIG. 5 is a block diagram of an embodiment of the mobile power plant system 10 of FIG. 1, depicting one or more interconnects 44 between the auxiliary skid 32 and the gas turbine engine 22. The illustrated embodiment is a block diagram of an embodiment an assembled mobile power plant system 10, after the transportation and installation phases. As noted above, in certain embodiments, the arrangement of the partially assembled components on the one or more trailers 11 may help reduce a number of interconnects (e.g., electrical power and/or data communication cables 45, fluid lines 181, etc.) between the one or more trailers 11, thereby reducing an installation time and improving a speed with which the mobile power plant system 10 may be assembled. In the illustrated embodiment, a partial view of the mobile power plant system 10, including the turbine trailer 12 and the generator trailer 14, after an installation phase, is depicted. In particular, in the illustrated embodiment, one or more interconnects communicatively couple a turbine control panel 150 disposed within the auxiliary skid 32 to one or more systems associated with the gas turbine engine 22, as further described in detail below. In certain embodiments, the interconnects 44 may be electrical power and/or data communication cables 45, as well as fluid lines 181 that are configured to route a fluid (e.g., synthetic lube oil, hydraulic lube oil, water, cleaning fluid, etc.) from the auxiliary skid 32 to the gas turbine engine 22.

In certain embodiments, the gas turbine engine 22 may include a gas turbine 152 coupled to the compressor 154 via the common shaft 56. Atmospheric air 156 may enter the filter assembly 82 to remove contaminants prior to entering the compressor 154. The filter assembly 82 may include filtration equipment to remove dust, sand, discharge gases, or other environmental contaminants from the air 156 prior to entering the intake section 30. The compressor 154 intakes oxidant (e.g., air 156) into the gas turbine engine 22 via the air intake section 30. As discussed herein, the oxidant may include, but is not limited to, air 156, oxygen, oxygen-enriched air, oxygen-reduced air, or any combination thereof. The oxidant (e.g., air 156) may be taken in by the air intake section 30 into the gas turbine engine 22 via a suitable intake section, such as a cold air intake section, for subsequent delivery of the oxidant into the compressor 154. In certain embodiments, the intake section 30 may utilize the heat exchanger to control the temperature of the filtered air prior to introducing the air 156 to the compressor 154. The compressor 154 compresses the inlet air, forming pressurized air (e.g., compressed air) by rotating blades within the compressor 154.

The pressurized air 158 enters a fuel nozzle 160 and mixes with a fuel 162 to form an air-fuel mixture. The gas turbine engine 22 may operate with a gas fuel or a liquid fuel. The fuel source may be regulated by the fuel system that may be coupled to a combustor 164. The fuel nozzle 158 directs the air-fuel mixture into the combustor 164. The combustor 164 ignites and combusts the air-fuel mixture, to form combustion products. The combustion products are directed to the gas turbine 152, where the combustion products expand and drive blades of the gas turbine 152 about the shaft 56. The gas turbine 22 may drive the load 50 via the common shaft 56. As will be appreciated, the load 50 may include the generator 52 (e.g., electrical generator). Eventually, the combustion products exit the gas turbine 152 as exhaust gases 166, which then exit the mobile power plant system 10 via an exhaust stack 84. In some embodiments, the exhaust gases 166 may be directed outside the enclosure 24.

The gas turbine engine 22 may be coupled to the ventilation system 78 (e.g., the vent system 78) and the exhaust stack 84. The ventilation system 78 may remove some of the heat from the turbine 152 so that the turbine 152 may operate without disruption due to overheating. The ventilation system 78 may also enable leaked gas to be diluted and dispersed adequately to avoid accumulation of gas. The exhaust gases 166 may exit the gas turbine engine 22 through a diffuser into the exhaust stack 84. The exhaust stack 84 may be coupled to the gas turbine engine 22 by an exhaust frame. The exhaust stack 84 may enable high-pressure gases to exit the enclosure of the gas turbine engine 22 in embodiments where the mobile power plant system 10 is enclosed.

In certain embodiments, the gas turbine engine 22 may include additional support systems, such as for example, a lubrication system 170, a hydraulics start system 172, and/or a water wash system 174. The lubrication system 170 may be configured to circulate a lubricant (e.g., a synthetic lube oil through the hydraulics start system 172, a hydraulic lube oil through the turbine 152, or a combination of the synthetic lube oil and the hydraulic lube oil through both) in order to lubricate moving parts of the gas turbine engine 22. In certain embodiments, four interconnects 44 (e.g., four fluid lines 181) may enable fluid communication between the lubrication system 170 and the auxiliary skid 32. The water wash system 174 may be configured to pump water (or other cleaning fluid) through the gas turbine engine 22 to clean the gas turbine engine 22. In certain embodiments, one interconnect 44 (e.g., one fluid line 181) may enable fluid communication between the water wash system 174 and the auxiliary skid 32. The hydraulics start system 172 may include a motor 176 associated with the gas turbine engine 22, and the hydraulics start system 172 may be configured to engage the motor 176 to start operations of the gas turbine engine 22. In certain embodiments, three interconnects 44 (e.g., three data and/or fluid lines 181) may enable fluid communication between the hydraulics start system 172 and the auxiliary skid. In certain embodiments, additional support system may include a fluid injection system for injecting one or more fluid flows (e.g., water, steam, inert gas such as nitrogen, recirculated exhaust gas, cleaning fluid, oil, or any combination thereof) into the gas turbine engine 22, a coolant system, a fuel system configured to supply a fuel flow, a thermal/clearance control system, or any other support system associated with the gas turbine engine 22.

In particular, in certain embodiments, the turbine control panel 150 (e.g., TCP 150) disposed within the auxiliary skid 32 may be configured to directly interface with the one or more support components of the gas turbine engine 22. For example, in certain embodiments, the turbine control panel 150 may include various support wiring and/or instruments configured to support operations of each of the one or more support systems of the gas turbine engine 22 (e.g., the lubrication system 170, the hydraulics start system 172, and/or the water wash system 174).

In certain embodiments, the auxiliary skid 32 may include various support components to additionally support the operations of the support systems. For example, the water wash system 174 of the gas turbine engine 22 may be associated with various water wash components 180 (e.g., tank, pump, filters, motor control, etc.) disposed within the auxiliary skid 32. As further described with respect to FIG. 6, the water wash components 180 may be communicatively coupled (and/or fluidly coupled) to the water wash system 174 of the gas turbine engine 22, and may regulate a flow of water for cleaning the gas turbine engine 22. Accordingly, in addition to one or more interconnects 44 (e.g., cables 45 and fluid lines 181) between component of the gas turbine engine 22 and the auxiliary skid 32, one or more fluid lines 181 may be provided between the auxiliary skid 32 and the gas turbine engine 22 across a length 183 of the turbine trailer 12.

As a further example, in certain embodiments, the lubrication system 170 of the gas turbine engine 22 may be associated with various lubrication system components 182 (e.g., tank, filters, pumps, instrumentations, motor control, etc.). The lubrication system components 182 may include a source of the lubricant utilized by the lubrication system 170 to circulate the lubricant through the gas turbine engine 22. In certain embodiments, the lubrication system 170 may include a tank that is configured to hold both a synthetic lube oil (e.g., utilized within the hydraulics start system 170) and a hydraulic lube oil (e.g., utilized within the turbine 152). In particular, in certain embodiments, the synthetic lube oil and the hydraulic lube oil may be combined within a single tank. Similarly, one or more fluid lines 181 between the lubrication system 170 and the lubrication components 182 may extend across the length 183 of the turbine trailer 12. As a further example, in certain embodiments, the hydraulics start system 172 of the gas turbine engine 22 may include a hydraulics motor 176 configured to start the operations of the gas turbine engine 22. In certain embodiments, various support components and instrumentation (e.g., hydraulics start components 184) may be utilized to regulate the hydraulics motor 176 via the interconnects 44 (e.g., electrical power and/or data communication cables 45, fluid lines 181, etc.) running the length 183 of the turbine trailer 12 between the gas turbine engine 22 and the auxiliary skid 32.

In certain embodiments, the turbine control panel 150 may be associated with a controller configured to receive and process feedback from gas turbine engine 22. For example, the turbine control panel 150 may be associated with the memory 76 and the processor 74. The memory 76 may store software instructions or code that is executable by the processor 74 to control various aspects of the gas turbine engine 22 and the support systems (e.g., the lubrication system 40, the water wash system 42, etc.). Furthermore, in certain embodiments, the turbine control panel 150 may interface (e.g., provide feedback and/or one or more data communication channels) with the control system 70 of the control house trailer 16. Accordingly, in this manner, including one or more support components associated with the gas turbine engine 22 within the auxiliary skid 32 may help to reduce interconnects 44 between the one or more trailers, thereby reducing an installation time and improving a speed with which the mobile power plant system may be assembled. Specifically, including support components associated with support systems of the gas turbine engine 22 within the auxiliary skid may help reduce a number of interconnects between the gas turbine engine 22 and the control house trailer 16.

Figure 6:
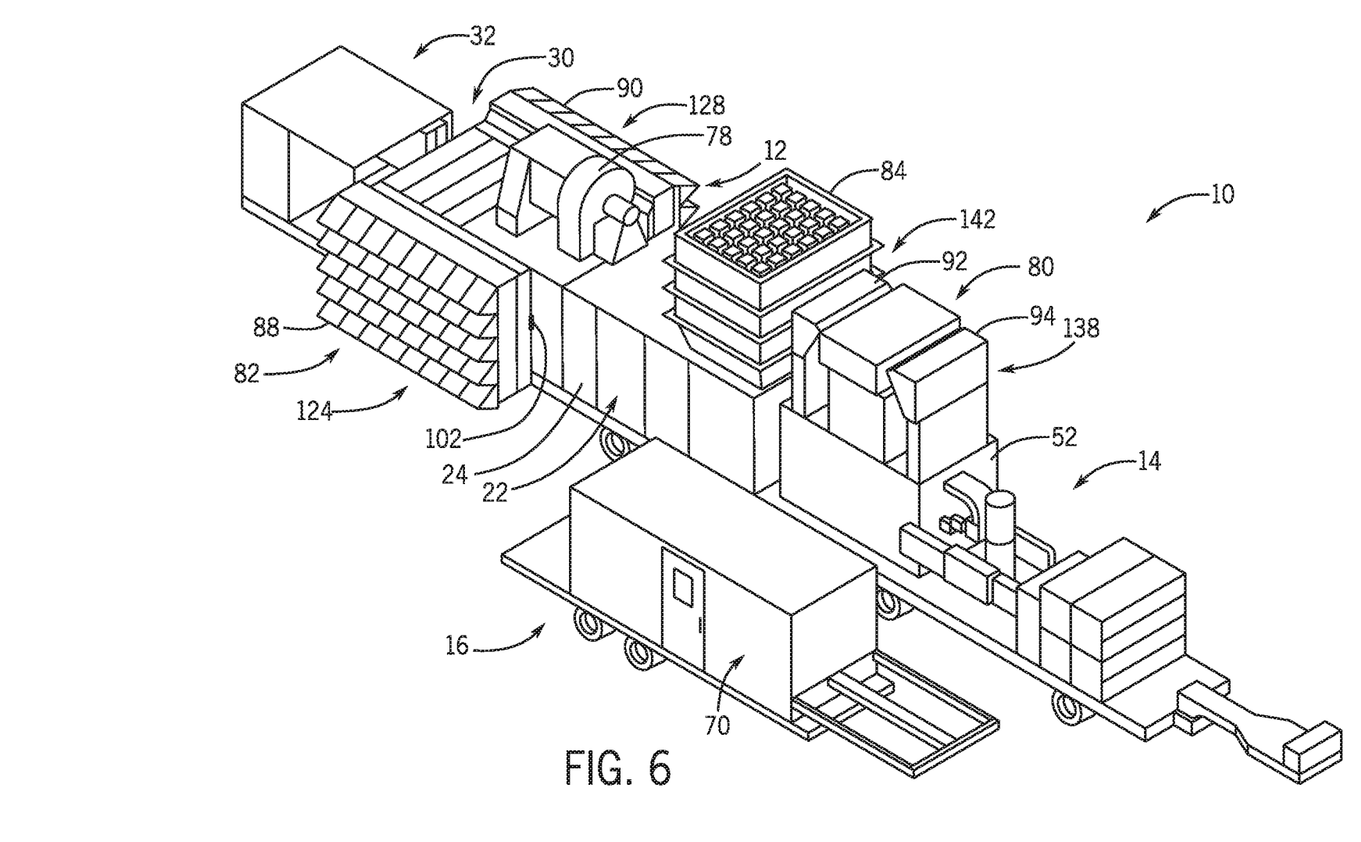
FIG. 6 is a perspective view of an embodiment of the mobile power plant system of FIG. 1 after an installation phase.

FIG. 6 is a perspective view of an embodiment of the mobile power plant system 10 of FIG. 1 after an installation phase. Specifically, in the illustrated embodiment, the generator 52 mounted on the generator trailer 14 may be coupled with the gas turbine engine 22 mounted on the turbine trailer 12. Further, one or more components mounted on the transport trailer 18 and/or the control house trailer 16 may be transferred and installed to commission the mobile power plant system 10 for generating power.

As noted above, in certain embodiments, after the installation phase, the filter assembly 82 and the exhaust stack 84 may be coupled to the gas turbine engine 22. Specifically, the first filter 88 may be coupled to the first side 124 of the air intake section 30. Likewise, the second filter 90 may be coupled to the second side 128 (opposite the first side 124) of the air intake section 30. In particular embodiments, as noted above with respect to FIG. 2, the first and second filters 88, 90 may be fastened or secured to the air intake section 30 via the one or more attachment mechanisms 102. Furthermore, the one or more support mechanisms 104 may be utilized to secure the first and second filters 88, 90 along the first and second sides 124, 128 of the air intake section 30. In certain embodiments, the exhaust stack 84 may be mounted proximate to the top surface of the enclosure 24 configured to enclose the gas turbine engine 22. In certain embodiments, the top surface of the enclosure 24 may include a roof access that enables an operator to perform maintenance or repairs to components within the gas turbine engine 22. Further, the roof access via the top surface of the enclosure 24 may enable faster engine removal through the roof.

In certain embodiments, the vent system 78 may be mounted above the air intake section 30 and the gas turbine engine 22, such that it is coupled to a top surface of the enclosure 24. Furthermore, in certain embodiments, the air vent system 80 may be mounted above the generator 52, such that it is disposed above a top surface of the generator 52. Additionally, in certain embodiments, the air inlet filter assembly 86 (including the first air inlet filter 92 and the second air inlet filter 94) may be coupled to the first and second sides 138, 142 of the air vent system 78.

Figure 7:
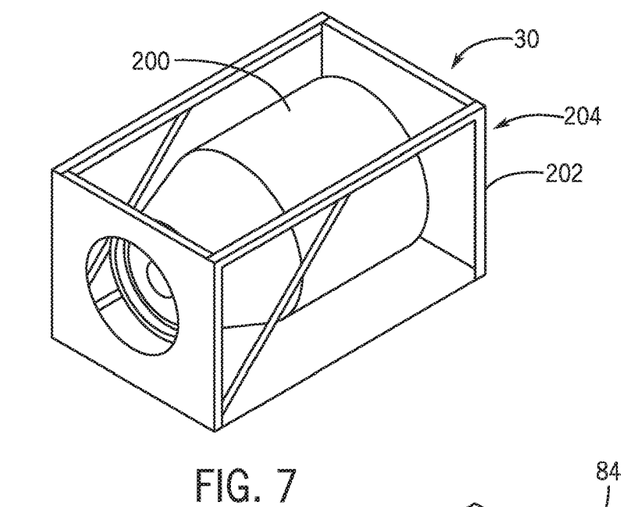
FIG. 7 is a perspective view of an embodiment of a silencer disposed within a housing on the turbine trailer of FIG. 1, during a transportation phase of the mobile power plant system.

FIG. 7 is a perspective view of an embodiment of a silencer 200 disposed within a housing 202 of the air intake section 30 of the turbine trailer 12 of FIG. 1, during a transportation phase of the mobile power plant system 10. In the illustrated embodiment, the housing 202 may include a frame 204 configured to enclose and encase the silencer 200 during the transportation phase. In particular, the silencer 200 may be disposed within the air intake section 30, and may be mounted onto the turbine trailer 12 for transportation to the installation site.

Figure 8:
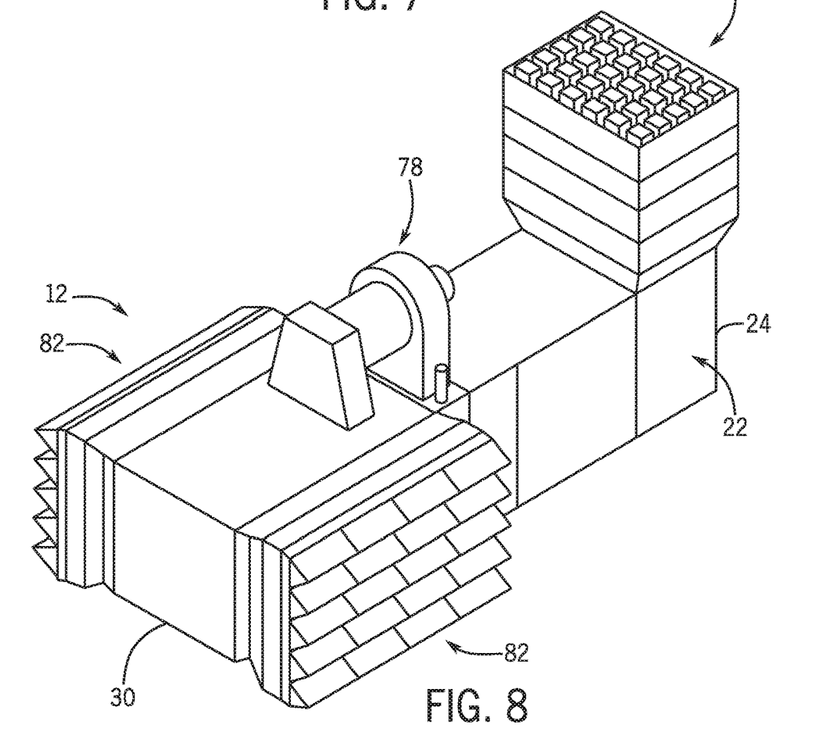
FIG. 8 is a perspective view of an embodiment of a ventilation system and an exhaust stack of the turbine trailer of FIG. 3, after an installation phase of the mobile power plant system, where the ventilation system is coupled to the housing of FIG. 7.

FIG. 8 is a perspective view of an embodiment of the ventilation system 78 and the exhaust stack 84 of the turbine trailer 12 of FIG. 3, after an installation phase of the mobile power plant system 10, where the ventilation system 78 is coupled to the enclosure 24 surrounding the gas turbine engine 22 of FIG. 7.

Technical effects of the invention include transporting components of a mobile power plant system 10 to an installation site via a trailer-mounted system to meet power demands of customers where permanent power plants may not be able to deliver power. In certain embodiments, during the transportation phase of the mobile power plant system 10, the generator trailer 14 may transport the generator 52 that generates power for the mobile power plant system 10. The turbine trailer 12 may transport the gas turbine engine 22, the intake section 30 that includes the silencer 200 disposed within the silencer housing 202, and/or the auxiliary skid 32. In certain embodiments, the auxiliary skid 32 may be disposed at the rear of the turbine trailer 12 and may include a number of components that are coupled (e.g., communicatively coupled) to a number of the components associated with the gas turbine engine 22. Further, during the transportation phase, the control house trailer 16 may transport the control system 70 having the controller 72, the ventilation system 78 for the gas turbine engine 22, and the air ventilation system 80 for the generator 52. Further, in certain embodiments, the transport trailer 18 may transport the filter assembly 82, the air inlet filter assembly 86, and/or the exhaust stack 84.

During the installation phase, one or more of the components transported to the installation site by the trailers 11 may be rearranged to assemble and commission the mobile power plant system 10. Accordingly, the disclosed embodiments are directed to systems and methods for reducing a trailer count of the mobile power plant system 10 by improving the arrangement of the partially assembled components disposed on the one or more trailers 11 during transportation. Furthermore, the arrangement of the partially assembled components on the turbine trailer 12 (e.g., auxiliary skid 32) may help reduce interconnects between the turbine trailer 12 and the control house trailer 16, thereby reducing an installation time and improving a speed with which the mobile power plant system may be assembled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a first mobile body configured to support both a turbine engine and an auxiliary skid communicatively and fluidly coupled to the turbine engine, wherein the first mobile body has one or more first wheels, and the auxiliary skid comprises one or more interconnects configured to support a turbine engine component; and
a second mobile body configured to support a generator, wherein the second mobile body has one or more second wheels, and the first and second mobile bodies are configured to align a removable coupling between the turbine engine and the generator.

2. The system of claim 1, comprising a mobile turbine system having the turbine engine, the generator, the auxiliary skid, and a control system, wherein the first mobile body comprises a first trailer having both the turbine engine and the auxiliary skid, and the second mobile body comprises a second trailer having the generator.

3. The system of claim 2, comprising a third mobile body configured to support the control system.

4. The system of claim 1, wherein the turbine engine component comprises a lubrication system, a water wash system, a hydraulics start system, or a combination thereof.

5. The system of claim 1, wherein the turbine engine component comprises a motor associated with the turbine engine, and wherein the auxiliary skid comprises a first cable interconnect configured to control the motor.

6. The system of claim 1, wherein the auxiliary skid comprises a tank or a pump configured to supply a fluid to the turbine engine component via a fluid line interconnect.

7. The system of claim 6, wherein the fluid comprises oil, water, steam, inert gas, recirculated exhaust gas, or a combination thereof.

8. The system of claim 6, wherein the fluid comprises a synthetic lube oil, a hydraulic lube oil, or a combination thereof.

9. The system of claim 8, wherein the tank is configured to combine the synthetic lube oil and the hydraulic lube oil.

10. A system, comprising:
a first mobile body configured to support both a turbine engine and an auxiliary skid communicatively and fluidly coupled to the turbine engine, wherein the first mobile body has one or more first wheels, and the auxiliary skid comprises a controller configured to support a turbine engine component;
a second mobile body configured to support a generator, wherein the second mobile body has one or more second wheels, and the first and second mobile bodies are configured to align a removable coupling between the turbine engine and the generator; and
a third mobile body configured to support a control system communicatively coupled to the controller of the auxiliary skid, wherein the third mobile body has one or more third wheels.

11. The system of claim 10, wherein the first mobile body comprises a first trailer, the second mobile body comprises a second trailer, and the third mobile body comprises a third trailer.

12. The system of claim 10, wherein the auxiliary skid comprises one or more cable interconnects configured to communicatively support a turbine engine component.

13. The system of claim 12, wherein the turbine engine component comprises a lubrication system, a water wash system, a hydraulics start system, or a combination thereof.

14. The system of claim 12, wherein the turbine engine component comprises a motor associated with the turbine engine, and wherein the auxiliary skid comprises a first cable interconnect configured to control the motor.

15. The system of claim 10, wherein the auxiliary skid comprises a tank or a pump configured to supply a fluid to the turbine engine component via one or more fluid line interconnects.

16. The system of claim 15, wherein the fluid comprises oil, water, steam, inert gas, recirculated exhaust gas, or a combination thereof.

17. A system, comprising:
a first mobile body configured to support both a turbine engine and an auxiliary skid communicatively and fluidly coupled to the turbine engine, wherein the first mobile body has one or more first wheels, the turbine engine is configured to removably couple to a generator disposed on a second mobile body having one or more second wheels, and the auxiliary skid comprises a controller communicatively coupled to a turbine engine support component; and
a third mobile body configured to support a control system communicatively coupled to the controller of the auxiliary skid, wherein the third mobile body has one or more third wheels.

18. The system of claim 17, wherein the first mobile body comprises a first trailer, the second mobile body comprises a second trailer, and the third mobile body comprises a third trailer.

19. The system of claim 17, wherein the auxiliary skid comprises a support component associated with the turbine engine support component, and wherein the support component is configured to supply a flow of a fluid to the turbine engine via a fluid line interconnect, wherein the support component comprises a pump or a tank configured to supply the flow of the fluid to the turbine engine, and wherein the fluid comprises oil, water, steam, inert gas, recirculated exhaust gas, or a combination thereof.

20. The system of claim 17, wherein the turbine engine support component comprises a hydraulics motor configured to start the turbine engine.

* * * * *